United States Patent Office 3,556,877
Patented Jan. 19, 1971

3,556,877
METHOD FOR HARDENING A TUBULAR SHAPED STRUCTURE
Akira Ujiie, Kobe-shi, Japan, assignor to Mitsubishi Jukogyo Kabushiki Kaisha, Tokyo, Japan
Filed Mar. 27, 1968, Ser. No. 716,646
Claims priority, application Japan, Apr. 3, 1967, 42/21,131
Int. Cl. C21d 9/08
U.S. Cl. 148—143                3 Claims

ABSTRACT OF THE DISCLOSURE

A method of quenching and tempering including controlling the heat treatment, controlling the immersion in a cooling medium and controlling repeated cycles to produce a stronger steel structure.

---

The present invention relates to a method and apparatus for hardening a tubular-shaped thick-walled and large-sized structure.

According to the prior art, when a hollow and normally cylindrical large-sized pressure container having a thick wall and a large diameter is to be made of tempered high tensile strength steel plates, each steel plate is first bent into an arcuate shape. Each steel plate is then tempered and thereafter welded together into a tubular body. This welding process must take place at a temperature that imparts a low heat to the metal. This is necessary so that the welding heat will not adversely affect the tempered effect in the steel. In the alternative, each steel sheet is bent and welded together into a tubular body. The whole structure is then heated in a heating furnace and immersed in a water tank for tempering. In the first mentioned method of the prior art, however, only a low heat welding method can be utilized in order to avoid the adverse affects upon the temper of steel. Therefore the welding efficiency is reduced. Therefore, the metal being attached by welding must be of higher steel alloy than the base metal to provide a suitable strong bond with the base metal. This follows because the temper of the metal being welded is different than the temper of the base structure and the welded bond cannot equalize the temper resulting in a bond of less strength than desirable. In the last mentioned method, any suitable welding method can be used and the metal sheets individually affixed by welding to form a large structure can as a single unit be tempered at the same time and to the same degree. However, to accomplish this a large-sized heating furnace, a hoist equipment, a water tank, etc. must be provided. However, the accurate uniform tempering of a large-sized thick-walled structure is difficult in equipment used today.

It is an object of the present invention to provide an improved method and apparatus to achieve positive and accurate tempering by means of the improved method and apparatus of the present invention. Briefly, the present invention is to provide a method and apparatus for tempering a tubular-shaped thick-walled and large-sized structure, whereby the rotating structure is at the upper half continuously heated as it passes through electromagnetic induction heating means, at the same time said structure is at the lower half continuously cooled as it passes through a cooling medium tank, thus the heating and cooling stages are continuously and repeatedly performed so that successive superimposed heating and quenchings will produce a uniform tempering throughout from the skin part of the structure to the center thereof.

It is a further object of the present invention to provide a method and apparatus to obtain a uniform temper in large cylindrical structures composed of a plurality of individual sections previously welded into a unitary structure.

Now the invention will be described in more detail with reference to the accompanying drawings in which a typical embodiment of the invention is illustrated. In the drawings.

Figure 1:
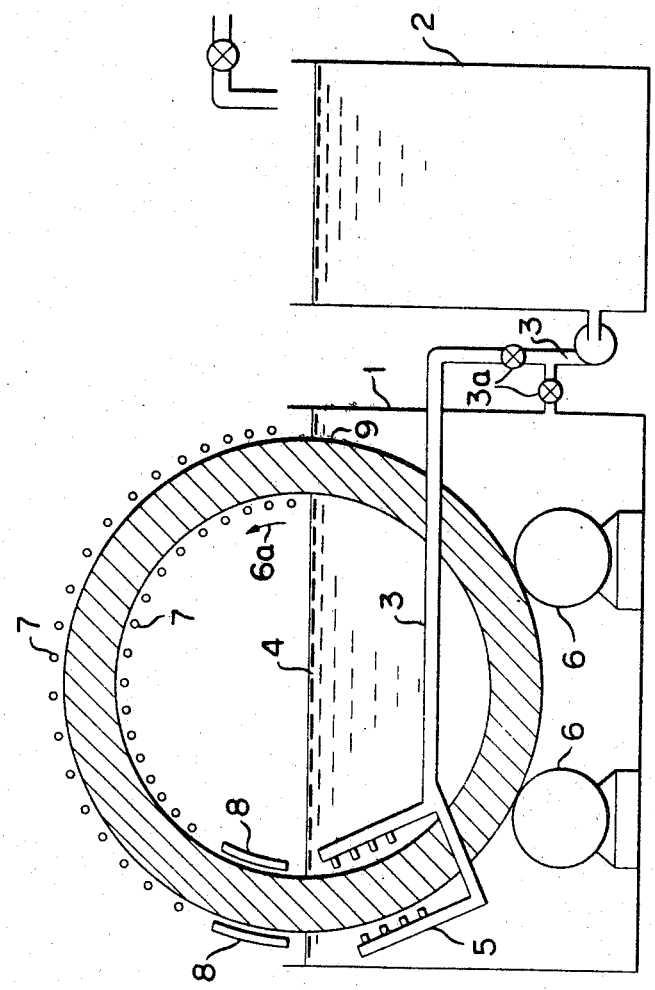
FIG. 1 is a schematic view showing an embodiment of the invention.

In FIG. 1, there is provided a cooling medium tank 1; an auxiliary cooling medium tank 2 adapted to supply cooling medium 4 into the first mentioned cooling medium tank 1 through a conduit 3 as controlled by valves 3a. The cooling medium injecting pipes 5 are connected with the conduit 3 and located so that their upper extremity 5a is disposed below the surface level of the cooling medium and adapted to spray cooling medium on the inside and outside surface area of the structure passing along the path defined by said pipes 5. The rotary supporting bases 6 are located on the bottom of the cooling medium tank 1 to support the structure to be tempered. The electromagnetic induction heating coils 7 and 8 are disposed articuately above the cooling medium tank 1 to define a heated path through which the structure to be tempered can pass. Thus, heat is equally imparted to the inner and outer surfaces of the steel structure. These coils 7 and 8 constitute the heating furnace wherein the coils 7 constitute the low frequency electromagnetic induction heating coil while 8, the high frequency electromagnetic induction coil. These coils 7 and 8 are capable of heating a thick-walled tubular structure 9 to the extent that the structure can be heated up to its center by a single heating. The tubular shaped structure 9 to be quenched in the tank 1 is supported by the rotary supporting members 6 with its axis being substantially horizontal in such a way that the lower half of the tubular shaped structure 9 is immersed within the cooling medium 4 while the upper half thereof is disposed above the cooling medium level in the path of the opposed heating coils 7 and 8. The electromagnetic induction heating coils 7 and 8 are disposed around the tubular shaped structure 9 in such a way that the structure 9 is free to rotate.

With the structure described hereinbefore, when the rotary supporting members 6 are caused to operate and to cause the members to be driven in a counterclockwise direction as indicated by the arrow 6a, the electromagnetic induction heating coils 7 and 8 are energized at the same time. During the time when the portion or region of the structure 9 initially located at three o'clock (the position which corresponds with three o'clock when the tubular shaped structure is assumed to be a clock) moves within the low frequency electromagnetic induction heating coil 7 to the position passing between the opposed heating coils of 10 o'clock, the portion will be heated by the induction coil 7 up to about 700° C. While this portion passes through the high frequency induction coil 8 from 10 o'clock to 9 o'clock, it will be further elevated to the temperature of about 900° C. Thereafter, the heated portion is driven into the cooling medium 4 to be rapidly cooled. The treated portion is immersed into the tank 1 and in addition, further cooling medium is directed upon the structure as at 7 o'clock from the cooling medium injecting pipes 5, as needs demand, for facilitating the quenching process. The portion being quenched passes through the cooling medium 4 and finally returns to its initial position, 3 o'clock, thus completing the first cycle of quenching. By this combined action of coils 7 and 8 for heat and the cooling action of the cooling medium in tank 1 and the cooling medium ejected from pipes 5 the skin part of the structure 9 is heated and quenched. The speed of rotation of the tubular shaped structure 9 is adjusted with respect to the heat applied to the electromagnetic induction coils 7 and 8 so that the heating temperature 900° C. at 9 o'clock will be achieved. At the same time, the cooling action at 8 o'clock position can be adjusted by means of controlling the rate of discharge of the cooling medium into the structure portion opposite the injecting tubes 5. Therefore, the precise quenching can be effected.

Figure 2:
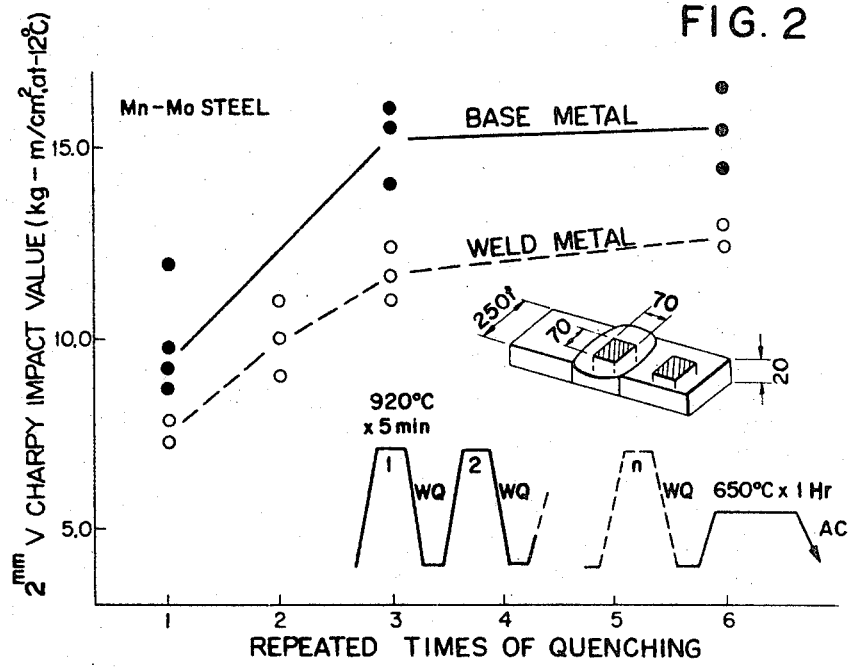
FIGS. 2 and 3 are graphs indicating results of tests respectively.
Figure 3:
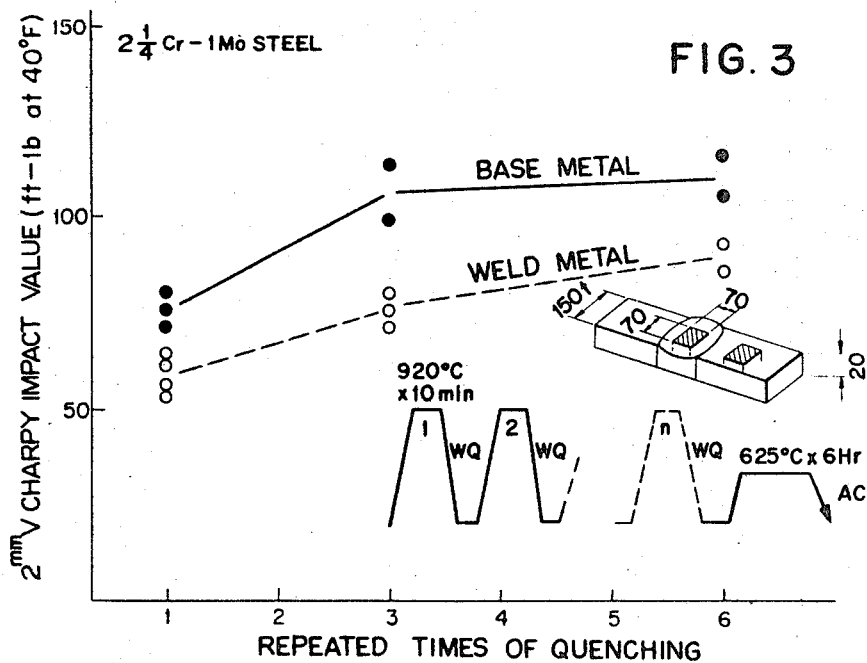

After the first cycle of quenching has been completed to temper the skin of the structure through, the second cycle follows. In this second cycle, more heating is applied while the rotating speed is reduced. Further, the injection of cooling medium into the heated structure through the injecting pipes 5 is increased. Accordingly, by increasing the heating and the cooling and thus making the difference more abrupt, not only the skin part but also a part thereunder is heated and quenched. Due to the heating and quenching of the skin part, the quenching effect penetrates to the part under the skin as a result of the compression stress induced to the skin part. In the same way, the third cycle continues. Repeating the cycles, successive quenchings penetrates to the central part with good results. This superimposed quenching permits the thick-walled tubular structure to be improved in mechanical properties, especially an impact test value. The test results are indicated in FIGS. 2 and 3.

According to the present invention, the rotating speed of the structure 9, the heat input of the electromagnetic induction coils 7 and 8, and the cooling medium injection quantity of the injecting pipes 5 are adjusted to achieve a controlled cycle of quenching. Thereby, the superimposed quenching by successive cycles wherein each cycle includes a controlled heating stage related to a subsequent quenching stage achieves a uniform temper in the steel composition structure from the outer skin to the inner core that is both accurate and effective.

According to the present invention, the heat-treatment equipment can be arranged and disposed compact in size and operated in a simple manner, as compared with the prior art equipment in which the furnace and the cooling water tank are separately disposed and the hoisting equipment must be provided. According to the present invention the electromagnetic induction coils 7 and 8 are disposed above the cooling medium tank 1. The lower half of the tubular structure 9 is immersed in tank 1 in such a way that the portion of the structure 9 heated at the upper half thereof is rotated repeatedly for the sucessive rapid cooling and quenching.

In brief, the present invention provides a method for quenching a tubular-shaped thick-walled and large-sized structure, in which localized heating and cooling is continuously performed and adjustment is easy for each state, i.e., heating and cooling independently during every quenching stage. Thus, repeated superimposed quenching assures accuracy of temper and also good mechanical properties. It will be, therefore, clearly understood that compared with the prior art apparatus in which the furnace and the cooling water tank are separately disposed and the hoisting equipment must be provided, the apparatus of the present invention is compact in size and relatively easy to operate whereby the cost of operation and installation is much reduced. It should be further understood that when the present invention is utilized in manufacturing a tubular shaped structure initially assembled by welding together independently formed sheets of bent steel, the quenching process essential to tempering can be effected after welding in a very simple and accurate manner. Therefore the special welding method requiring an expensive high alloy welding rod and sizable quenching apparatus can be advantageously eliminated.

What is claimed is:
1. A method of tempering a tubular-shaped thick-walled steel structure including the steps of:
   (1) heating a portion of the steel structure,
   (2) quenching the heated portion by rotating,
   (3) continuously repeating the heating and quenching cycles at least two times while the steel structure constantly rotates; and
   (4) changing the intensity of the heat and the degree of cooling while the steel structure rotates to temper the steel structure evenly from the outer skin of the steel structure to the inner core, so that, as the tube rotates, consecutive heating and quenching is applied over the entire tube.

2. A method as defined in claim 1 including varying the rotation cycle of the tube with respect to the heating and quenching cycles to achieve more uniform tempering throughout the thickness of said structure.

3. A method as defined in claim 1 including heating said tube portion first to 700° C. and then applying added heat just before quenching to impart 900° C. heat to said portion.

References Cited
UNITED STATES PATENTS

| | | | |
|---|---|---|---|
| 1,946,876 | 2/1934 | Northrup | 148—150 |
| 2,831,789 | 4/1958 | Gorman | 148—150 |

RICHARD O. DEAN, Primary Examiner

U.S. Cl. X.R.

148—127, 145, 150, 154